(12) United States Patent
Swinderman et al.

(10) Patent No.: US 6,591,969 B2
(45) Date of Patent: Jul. 15, 2003

(54) CONVEYOR BELT CLEANER SCRAPER BLADE WITH SENSOR AND METHOD OF MANUFACTURE

(75) Inventors: R. Todd Swinderman, Kewanee, IL (US); Andrew J. Waters, Kewanee, IL (US); Shawn D. Lay, Kewanee, IL (US); Pablo F. Perez, Kewanee, IL (US); Brian K. Kaiser, Buda, IL (US); Phillip E. Dietsch, Galva, IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 10/025,091

(22) Filed: Dec. 19, 2001

(65) Prior Publication Data

US 2002/0100661 A1 Aug. 1, 2002

Related U.S. Application Data

(63) Continuation-in-part of application No. 09/454,856, filed on Dec. 7, 1999, now Pat. No. 6,374,990.
(60) Provisional application No. 60/111,774, filed on Dec. 10, 1998.

(51) Int. Cl.[7] .............................................. B65G 45/12
(52) U.S. Cl. ...................... 198/497; 198/499; 198/502.1
(58) Field of Search ................................. 198/497, 499, 198/502.1

(56) References Cited

U.S. PATENT DOCUMENTS

| 4,182,444 | A | * | 1/1980 | Fisher | 198/499 |
|---|---|---|---|---|---|
| 4,465,362 | A | | 8/1984 | Tohma et al. | |
| 4,501,486 | A | * | 2/1985 | Landa | 355/15 |
| 4,598,823 | A | * | 7/1986 | Swinderman | 198/497 |
| 4,643,293 | A | * | 2/1987 | Swinderman | |
| 4,768,645 | A | * | 9/1988 | Farris | 198/499 |
| 4,819,026 | A | * | 4/1989 | Lange et al. | 355/15 |
| 4,927,003 | A | * | 5/1990 | Swinderman et al. | 198/497 |
| 5,088,965 | A | * | 2/1992 | Swinderman et al. | 474/101 |
| 5,278,620 | A | * | 1/1994 | Godlove | 355/299 |
| 5,426,485 | A | * | 6/1995 | Fujita et al. | 355/208 |
| 5,622,249 | A | * | 4/1997 | Morin | 198/499 |
| 5,838,245 | A | * | 11/1998 | Murakami et al. | 340/674 |
| 5,845,763 | A | * | 12/1998 | Van Tilburg | 198/626.6 |
| 6,076,656 | A | * | 6/2000 | Mat | 198/499 |
| 6,374,990 | B1 | * | 4/2002 | Swinderman | 198/497 |

FOREIGN PATENT DOCUMENTS

| EP | 0787669 | 8/1997 |
|---|---|---|
| JP | 60106710 | 6/1985 |

* cited by examiner

*Primary Examiner*—Christopher P. Ellis
*Assistant Examiner*—Rashmi Sharma
(74) *Attorney, Agent, or Firm*—Barnes & Thornburg

(57) ABSTRACT

A conveyor belt cleaner scraper blade for cleaning the surface of a conveyor belt and a method of manufacture of the scraper blade. The scraper blade includes a body having a base member adapted to be attached to a cross shaft of a conveyor belt cleaner and a scraping member which extends outwardly from the base member to a scraping tip. The scraper blade includes one or more electrical sensors that are embedded in an insert member. The insert member and the sensors are molded and embedded within the body of the scraper blade. Each of the sensors is adapted to provide an electrical output signal representing a physical condition of the scraper blade sensed by the sensor.

30 Claims, 3 Drawing Sheets

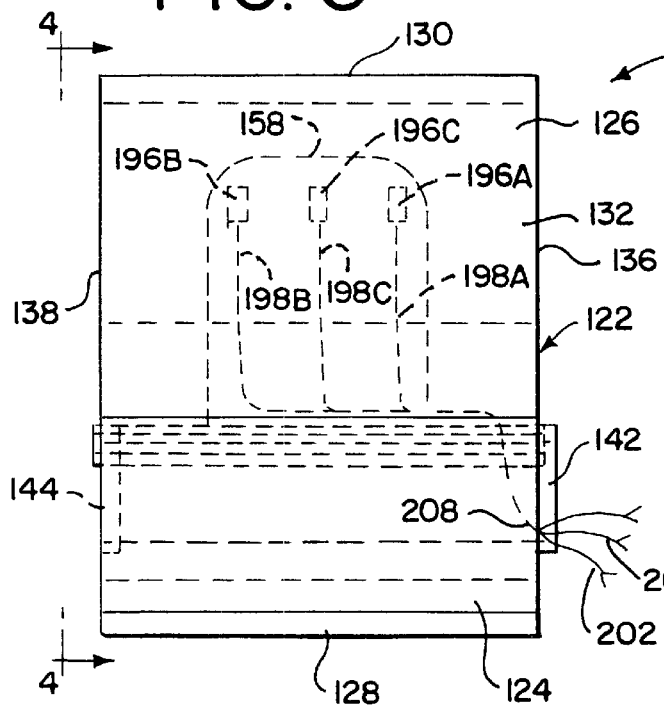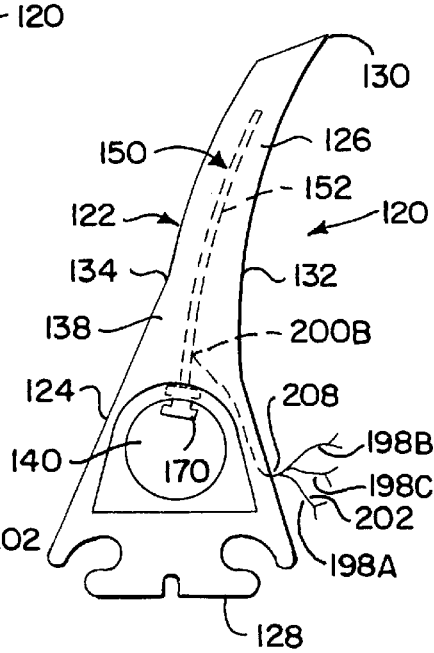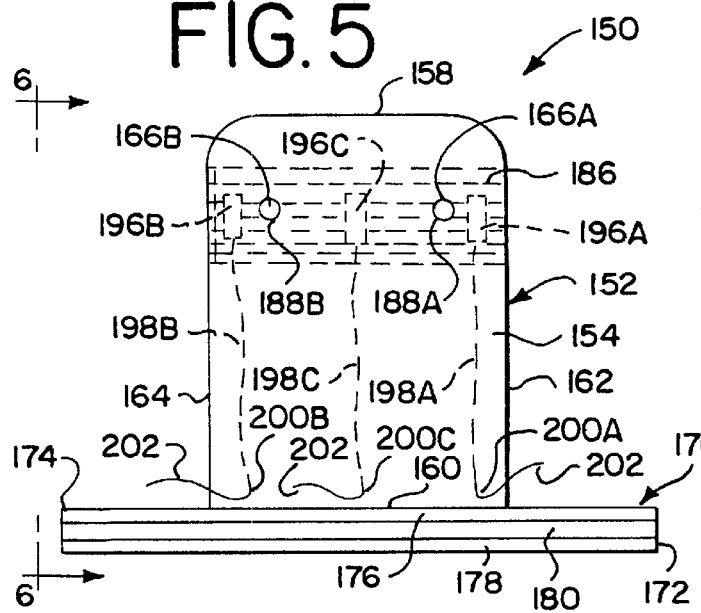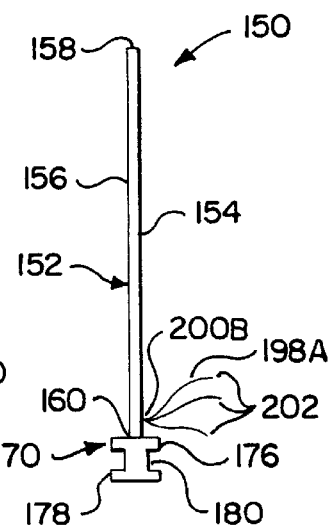

CONVEYOR BELT CLEANER SCRAPER BLADE WITH SENSOR AND METHOD OF MANUFACTURE

RELATED APPLICATIONS

This application is a continuation-in-part of U.S. application Ser. No. 09/454,856, filed Dec. 7, 1999, now U.S. Pat. No. 6,374,990, which claims the benefit of U.S. Provisional Application No. 60/111,774, filed Dec. 10, 1998.

BACKGROUND OF THE INVENTION

The present invention is directed to a conveyor belt cleaner scraper blade for scraping adherent material from a conveyor belt, and in particular to a conveyor belt cleaner scraper blade including one or more sensors for monitoring the operating conditions of the scraper blade and is also directed to its method of manufacture.

Some conveyor mechanisms utilize a moving conveyor belt to transport sand, gravel, coal and other bulk materials, from one location to another. As the bulk material is discharged from the conveyor belt, a portion of the material often remains adhered to the belt. Conveyor belt cleaners, including one or more scraper blades, are used to scrape the adherent material from the belt and thereby clean the belt. A primary conveyor belt cleaner may be placed in scraping engagement with the conveyor belt at the head pulley of the conveyor and a secondary conveyor belt cleaner may be placed in scraping engagement with and below the return run of the conveyor belt a short distance behind the primary conveyor belt cleaner. The scraper blades of a conveyor belt cleaner are removably attached to a rotatable or linearly adjustable cross shaft that extends transversely across the width of the conveyor belt. A tensioning device is attached to one or both ends of the cross shaft. The tensioning device applies a rotational or linear biasing force to the cross shaft which in turn moves the scraper blades into scraping engagement with the conveyor belt with a desired amount of force. During operation, the scraping edge of each scraper blade wears due to its scraping engagement with the rotating conveyor belt. The tensioner rotates or linearly adjusts the cross shaft and the scraper blades to maintain the scraper blades in biased scraping engagement with the conveyor belt.

In order to obtain optimum performance from the scraper blades of a conveyor belt cleaner, it is preferable that the scraper blades be biased into scraping engagement with the conveyor belt with a predetermined amount of force. If the scraper blades are biased against the conveyor belt with an excessive amount of force, this will result in excessive wear to the scraper blades, potential damage to the conveyor belt, and may cause the tip of the scraper blade to develop an excessively high temperature due to the friction generated between the scraper blade and the rotating conveyor belt. If the scraper blades are biased against the conveyor belt with too small of a force, the scraper blades may not effectively clean the conveyor belt. In addition, the scraping tip of the scraper blades may vibrate or chatter against the conveyor belt depending upon the amount of force with which the scraper blades are biased into engagement with the conveyor belt, thereby potentially damaging the scraper blades and/or the belt, and decreasing cleaning efficiency. It is therefore useful to monitor the conditions and parameters of a scraper blade during operation, such as the scraping tip temperature, the rate of wear of the scraper blade, and the magnitude of the force with which the scraper blade is biased into scraping engagement with the conveyor belt, to optimize the performance of the scraper blade. All of these parameters are subject to change depending on a number of factors including conveyor belt speed and the type of material being conveyed.

SUMMARY OF THE INVENTION

A conveyor belt cleaner scraper blade for cleaning the surface of a conveyor belt. The scraper blade includes a body having a base member adapted to be attached to the cross shaft of a conveyor belt cleaner and a scraping member that extends outwardly from the base member to a scraping tip which is adapted to engage the conveyor belt. The body of the scraper blade includes one or more electrical sensors such as temperature sensors, strain detection sensors and/or wear sensors. Each temperature sensor provides an indication of the temperature of the scraper blade at the location of the temperature sensor. The strain detection sensors provide an indication of the magnitude of the strain the scraper blade is subjected to during scraping engagement with the conveyor belt. The wear rate sensors provide an indication of the location of the scraping tip with respect to the base member as the scraper blade wears away due to its scraping engagement with the rotating conveyor belt and as the scraping tip moves closer to the base member. If other conditions need to be monitored other types of sensors may also be utilized. Ultimately, the information which is sensed by the sensors may be transmitted to a microprocessor that may vary the operating conditions of the conveyor belt, including the speed of the belt, the tension applied by a conveyor belt cleaner tensioner, or possibly sounding an alarm or other signal when the sensed information deviates from preset ranges.

The scraper blade is made by coupling the sensors to a first positioning member such as a mesh sheet including one or more mounting holes. The mesh sheet and the sensors are positioned with an insert mold by inserting portions of the insert mold through the mounting holes of the mesh sheet. Molten elastomeric material is poured into the insert mold to form an insert member having the sensors embedded therein. The insert member comprises a second positioning member for properly positioning the sensors within the body of the scraper blade. The insert member is inserted into a scraper blade body mold in a desired location. Molten elestomeric material is then poured into the body mold to form the body of the scraper blade with the insert member and electrical sensors molded and embedded within the body.

BRIEF DESCRIPTION OF THE DRAWING FIGURES

FIG. 3 is a front elevational view of another embodiment of a primary conveyor belt cleaner scraper blade according to the present invention.

FIG. 4 is a side elevational view taken along line 4—4 of FIG. 3.

FIG. 5 is a front elevational view of the insert member of the scraper blade of FIG. 3.

FIG. 6 is a side elevational view of the insert member taken along line 6—6 of FIG. 5.

DETAILED DESCRIPTION OF THE PREFERRED EMBODIMENTS

Figure 1:
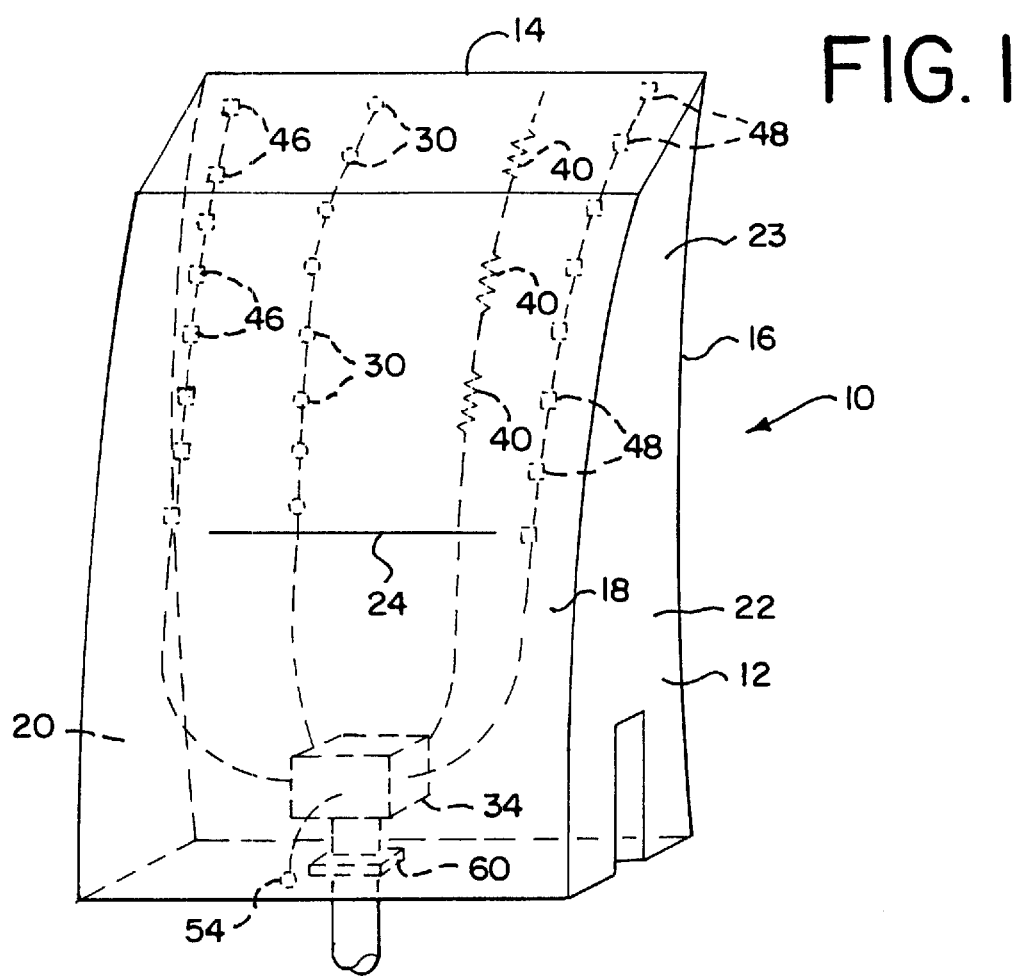
FIG. 1 is a perspective view of a primary scraper blade according to the present invention that is adapted for use in connection with a primary conveyor belt cleaner.

The primary conveyor belt cleaner scraper blade 10 of the present invention, as shown in FIG. 1, is adapted to be removably attached to a cross shaft (not shown) of a conveyor belt cleaner for engagement with the conveyor belt proximate the head pulley such as disclosed in U.S. Pat. No. 4,598,823 of Martin Engineering Company, which is incorporated herein by reference. One or more scraper blades 10 may be attached to the cross shaft. A tensioning device (not shown), such as disclosed in U.S. Pat. No. 5,088,965 of Martin Engineering Company, which is incorporated herein by reference, is attached to the end of the cross shaft and is adapted to provide selective conjoint movement (either rotational or linear) of the cross shaft and of the scraper blades 10 to move each scraper blade 10 into biased scraping engagement with the conveyor belt with a scraping force.

The scraper blade 10 includes a base member 12 that is adapted to be removably attached to the cross shaft in any of a number of ways known to one of ordinary skill in the art and a scraping tip 14 that is adapted to engage the conveyor belt. The scraper blade 10 also includes an inner surface 16 that extends from a first bottom edge of the base 12 to the tip 14 and an outer surface 18 that extends from a second bottom edge of the base 12 to the tip 14. The inner and outer surfaces 16 and 18 extend between a first side wall 20 and a second side wall 22. The inner and outer surfaces 16 and 18 may each include one or more curved and/or planar surface portions. The scraper blade 10 includes a wear section 23 that extends between the inner surface 16 and the outer surface 18 and that extends from the base 12 to the tip 14. The wear section 23 of the conveyor belt scraper blade 10 is adapted to wear during use such that the scraping tip 14 as shown in FIG. 1 is eventually located approximately at the bottom end of the wear section 23. A wear line 24 is located on the outer surface 18 adjacent the bottom end of the wear section 23. When the scraping tip 14 of the worn scraper blade 10 is located approximately at the wear line 24, such that the wear section 23 is substantially worn away, the scraper blade 10 should be replaced. The scraper blade 10 is preferably formed from an elastomeric material such as urethane or rubber.

As shown in FIG. 1, the scraper blade 10 includes one or more electrical temperature sensors 30 that are embedded within the wear section 23 of the scraper blade 10, or that are attached to the outer surface 18 of the scraper blade 10. One type of temperature sensor that may be used is Model LM 335 from National Semiconductors. The temperature sensors 30 are located along the length of the wear section 23 from the scraping tip 14 to approximately the wear line 24. Each temperature sensor 30 is electrically connected to a microprocessor 34 which may be located in the base 12 as illustrated in FIG. 1, or located elsewhere, and electrically connected to the sensor. One type of microprocessor that may be used is Model 68 HC11 microcontroller from Motorola. The microprocessor 34 may include a battery to operate the microprocessor 34 and data storage means for collecting and storing data. The temperature sensors 30 are adapted to measure the temperature of the scraper blade 10 at locations located along the length of the wear section 23, including the scraping tip 14 of the scraper blade 10. Each temperature sensor 30 transmits an electrical signal corresponding to the temperature measured by it to the microprocessor 34. The temperature sensors 30 may comprise thermocouples.

The scraper blade 10 also includes one or more electrical strain detection sensors 40 such as strain gage sensors. The strain detection sensors 40 may be embedded within the wear section 23, or attached to the outer surface 18 of the scraper blade 10. The strain detection sensors 40 are located along the length of the wear section 23 from the tip 14 of the scraper blade 10 to approximately the wear line 24. As the scraper blade 10 is preferably made of an elastomeric material such as urethane or rubber, the wear section 23 of the scraper blade 10 will resiliently flex between the base 12 and the tip 14 in response to the magnitude of the scraping force with which the tip 14 is pressed against the conveyor belt. The strain detection sensors 40 measure the strain of the scraper blade 10 due to the flexure of the scraper blade 10, which corresponds to the magnitude of the scraping force with which the scraper blade 10 is biased against the conveyor belt. The strain detection sensors 40 thereby provide a measurement that corresponds to the magnitude of the scraping force with which the scraper blade 10 engages the conveyor belt. Each strain detection sensor 40 sends an electrical signal corresponding to the measured strain and the corresponding scraping force to the microprocessor 34.

The scraper blade 10 also includes one or more first electrical wear rate sensors 46 and one or more second electrical wear rate sensors 48. The first and second wear rate sensors 46 and 48 are respectively located along the length of the wear section 23 from the tip 14 to the wear line 24 of the scraper blade 10. As shown in FIG. 1, the first wear rate sensors 46 extend along the left edge of the scraper blade 10 and the second wear rate sensors 48 extend along the right edge of the scraper blade 10. The first wear rate sensors 46 and the second wear rate sensors 48 are electrically connected to the microprocessor 34. The wear rate sensors 46 and 48 measure the current location of the scraping tip 14 with respect to a known location on the scraper blade 10, such as the bottom end of the wear section 23 at the wear line 24, as the end of the scraper blade 10 wears during use. Each first and second wear rate sensor 46 and 48 respectively sends an electrical signal to the microprocessor 34 which signals indicate the current position of the scraping tip 14 with respect to the bottom end of the wear section 23 or the top of the base member 12. As the outermost wear rate sensors 46 and 48 are worn away, a signal is no longer received from these sensors thereby indicating that the scraping tip 14 has worn past their location and indicating that the scraping tip 14 is presently located adjacent the outermost wear rate sensors 46 and 48 that are still sending signals to the microprocessor 34. Each wear rate sensor 46 and 48 may be combined with a respective temperature sensor 30 as a single combined sensor. A thermocouple may be used as a combined sensor to indicate both temperature and wear rate.

The scraper blade 10 also includes an ambient air temperature sensor 54 located in the outer surface 18, near the bottom wall of the base 12 of the scraper blade 10, that is adapted to be placed in communication with the surrounding air. The ambient air temperature sensor 54 measures the ambient temperature of the air in the area adjacent to the scraper blade 10. The ambient air temperature sensor 54 is electrically connected to the microprocessor 34 and sends an electrical signal to the microprocessor 34 that corresponds to the measured ambient air temperature. The ambient air temperature measured by the ambient air temperature sensor 54 can be compared to the scraping tip temperature measured by the temperature sensors 30 to determine the temperature differential therebetween, which corresponds to the increase in temperature of the scraping tip 14. The increase in temperature of the scraping tip 14 may be attributable to the friction created between the scraping tip 14 of the scraper blade 10 and the rotating conveyor belt, and/or to the transfer of heat from hot bulk material carried by the conveyor belt to the scraper blade 10.

The microprocessor 34 is electrically connected to an electrical transmitter member 60, such as an electrical connector member, located in the base 12. The electrical transmitter member 60 may be an RS232 serial port or other type of port such as an infrared port or a radio signal port. The electrical transmitter member 60 may be adapted to be attached to a cable that is connected to a computer. The transmitter member 60 transfers data collected by the microprocessor 34 and the sensors to the computer for storage and analysis.

Alternatively, the scraper blade 10 may not include the microprocessor 34, and each of the sensors 30, 40, 46, 48 and 54 may be electrically connected directly to the electrical transmitter member 60, such that the transmitter member 60 will transfer the respective signals generated by the sensors 30, 40, 46, 48 and 54 to a microprocessor located outside of the scraper blade 10 or directly to a computer.

Figure 2:
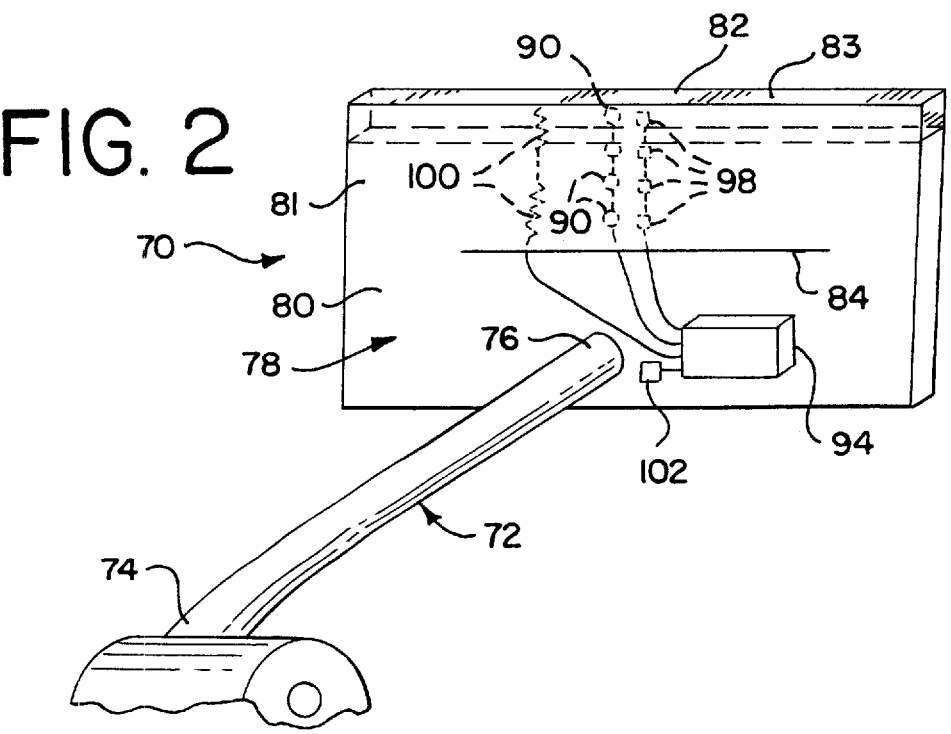
FIG. 2 is a perspective view of a secondary scraper blade according to the present invention that is adapted for use in connection with a secondary conveyor belt cleaner.

Another embodiment of the conveyor belt cleaner scraper blade of the present invention is shown in FIG. 2 and is designated with reference number 70. The scraper blade 70 is adapted for use in connection with a secondary conveyor belt cleaner, such as described in U.S. Pat. No. 4,643,293 of Martin Engineering Company, which is incorporated herein by reference. The scraper blade 70 includes an arm 72 having a first end 74 that is adapted to be connected to the cross shaft of the conveyor belt cleaner and a second end 76 that is adapted to be connected to a blade 78. The arm 72 and the blade 78 may be respectively formed from an elastomeric material such as urethane or rubber, or may respectively be made of a metal or ceramic material. The blade 78 includes a base member 80 and a wear section 81 having a scraping tip 82. The wear section 81 may include a wear resistant insert 83, formed from a metal such as tungsten carbide, that is connected to the end of the blade 78 to form the scraping tip 82.

The wear section 81 of the scraper blade 70 includes one or more temperature sensors 90 that are located along the length of the wear section 81 from the scraping tip 82 to a wear line 84 located adjacent to the bottom end of the wear section 81. The temperature sensors 90 are electrically connected to a microprocessor 94. The microprocessor 94 may be embedded within the blade 78 or may be adhesively bonded or otherwise attached to an exterior surface of the blade 78 or may be disposed at a remote location. The microprocessor 94 preferably includes one or more batteries for powering the microprocessor 94 and data storage means for collecting and storing data. Each temperature sensor 90 measures the temperature of the wear section 81 of the scraper blade 70 at its respective location, including at the scraping tip 82, and transmits an electrical signal corresponding thereto to the microprocessor 94.

The wear section 81 of the scraper blade 70 also includes one or more wear rate sensors 98 that are electrically connected to the microprocessor 94. The wear rate sensors 98 are located along the length of the wear section 81 from the scraping tip 82 to approximately the wear line 84. The wear rate sensors 98 indicate or measure the location of the scraping tip 82 relative to the bottom end of the wear section 81 at the wear line 84 as the scraping tip 82 wears down through use. Each wear rate sensor 98 transmits an electrical signal to the microprocessor 94 that is used to indicate the current location of the scraping tip 82. Each temperature sensor 90 may also be combined with a respective wear rate sensor 98 as a combined sensor that indicates both temperature and wear rate. Such a combined sensor may comprise a thermocouple.

The scraper blade 70 may also include one or more strain detection sensors 100, such as strain gage sensors, for sensing the amount of strain the blade 78 is subjected to during operation which corresponds to the scraping force with which the blade 78 engages the conveyor belt. Each strain gage sensor 100 transmits an electrical signal corresponding to the magnitude of the measured strain to the microprocessor 94.

The scraper blade 70 includes an electrical transmitter member 102 that is electrically connected to the microprocessor 94. The transmitter member 102 is adapted to be electrically connected to a cable and thereby to a computer. Alternatively, the microprocessor 94 may be eliminated from the scraper blade 70 and the sensors 90, 98 and 100 may be directly connected to the transmitter member 102.

The sensors of the scraper blades 10 and 70 are constructed so as to not wear or groove the conveyor belt. The temperature sensors 30 and 90 measure blade tip temperature, which can indicate whether the conveyor belt is running with or without material, or when the scraper blade is biased into scraping engagement with the conveyor belt with a larger or smaller than desired force. The strain detection sensors 40 and 100 measure strain and large amplitude vibrations or chatter at the scraping tip 14 and 82 of the scraper blades 10 and 70 to indicate the number of hours the scraper blades have been in operation and/or scraper blade chatter. The strain detection sensors 40 and 100 measure and indicate impact forces applied to the scraper blades 10 and 70 which in turn indicates the condition of the surface of the conveyor belt. The strain detection sensors 40 and 100 also indicate the bending or flexural strain in the scraper blades 10 and 70 which corresponds to the force with which the scraper blades are biased into engagement with the conveyor belt. The wear sensors 48 and 98 indicate the remaining useable scraping length of the wear sections 23 and 81 of the scraper blades 10 and 70 and the rate of wear of the wear sections.

The interval at which the microprocessors 34 and 94 acquire data from the sensors may be varied as desired from an interval such as sixty seconds for purposes of research and development to an interval of approximately five minutes for service uses. The data storage capacity of the microprocessors 34 and 94 may also vary, such as from ninety days of data storage capability for research and development purposes to a data storage capability of one year for service operations. The microprocessors may store all of the data collected by the sensors for review and analysis at a later date or may be connected to the conveyor drive mechanism and/or tensioning mechanism to automatically vary the speed of the conveyor belt or the tension applied to the scraper blades when the sensed data varies from predetermined ranges. Alternatively, the microprocessor may be connected to sound an alarm or activate some other signal when certain conditions are sensed. Also the sensors may be connected to display devices such as gauges or digital readout devices to display the conditions being sensed.

FIGS. 3 and 4 show another embodiment of a primary conveyor belt cleaner scraper blade of the present invention identified with the reference number 120. The scraper blade 120 includes a body 122 having a base member 124 and a scraping member 126. The base member 124 includes a generally T-shaped mounting member 128 at its bottom end which is adapted to be removably attached to the cross shaft of a conveyor belt cleaner. The scraping member 126 extends outwardly from the upper end of the base member 124 to a scraping tip 130. The scraping member 126 includes the wear section of the scraper blade 120. The scraper blade 120 includes an inner surface 132 that extends from a first bottom edge of the base member 124 to the scraping tip 130 and an outer surface 134 that extends from a second bottom edge of the base member 124 to the scraping tip 130. The inner and outer surfaces 132 and 134 of the scraper blade 120 may each include one or more curved and/or planar surface portions. The inner and outer surfaces 132 and 134 extend laterally between a first side wall 136 and a second side wall 138.

A generally cylindrical bore 140 extends through the base member 124 from the first side wall 136 to the second side wall 138. A projection 142 extends outwardly from the first side wall 136 at the base member 124. A recess 144 is located in the second side wall 138 at the base member 124. The bore 140 extends through the projection 142 and recess 144. The projection 142 is adapted to be located within and interlock with a recess in an adjacent scraper blade 120, and the recess 144 is adapted to receive and interlock with a projection from another adjacent scraper blade 120, such that the base members 124 of adjacent scraper blades interlock with one another. The body 122 of the scraper blade 120 is preferably formed from an elastomeric material such as urethane or rubber. If desired, the scraping member 126 may include a wear resistant scraping element at the scraping tip 130 which is adapted to engage the conveyor belt. The wear resistant scraping element may be made from a wear-resistant material such as tungsten carbide or a ceramic.

The scraper blade 120 includes an insert member 150 as best shown in FIGS. 5 and 6. The insert member 150 includes a generally plate-like member 152 having a first surface 154 and a second surface 156 which is generally uniformly spaced apart from the first surface 154. The plate-like member 152 includes a generally lineartop edge 158, and a generally linear bottom edge 160 which is spaced apart from and generally parallel to the top edge 158. A generally linear side edge 162 extends between and is generally perpendicular to the top and bottom edges 158 and 160. A generally linear side edge 164 extends between and is generally perpendicular to the top and bottom edges 158 and 160. The side edge 164 is spaced apart from and generally parallel to the side edge 162. The corners between the top edge 158 and the side edges 162 and 164 may be curved or rounded. One or more mounting holes 166A–B extend through the plate-like member 152 from the first surface 154 to the second surface 156. The mounting holes 166A–B are spaced apart from one another and are located a generally uniform distance from the top edge 158 of the plate-like member 152. The mounting holes 166A–B are also each located a generally uniform distance from a side edge 162 and 164.

The insert member 150 also includes a mounting member 170 attached to the bottom edge 160 of the plate-like member 152. The mounting member 170 extends generally linearly between a first end 172 and a second end 174. The ends 172 and 174 are located outwardly beyond the side edges 162 and 164 of the plate-like member 152. As best shown in FIG. 6, the mounting member 170 is generally I-shaped in cross section. The mounting member includes an upper flange 176, a lower flange 178 and web 180 which extends generally perpendicularly between the upper and lower flanges 176 and 178. An elongate generally rectangular channel is located between the upper and lower flanges 176 and 178 on each side of the web 180. The lower flange 178 and the web 180 form an elongate generally T-shaped mounting member. The insert member 150 is preferably formed from an elastomeric material such as urethane or rubber.

A mesh sheet 186 is embedded and molded within the plate-like member 152 of the insert member 150 adjacent the top edge 158. The mesh sheet 186 is located between the surfaces 154 and 156 and extends from a position adjacent the side edge 162 to a position adjacent the side edge 164. The mesh sheet 186 includes a plurality of apertures. The mesh sheet 186 also includes one or more mounting holes 188A–B which extend through the mesh sheet 186 and which are adapted to align with respective mounting holes 166A–B in the plate-like member 152. The mesh sheet 186 is generally planar and flexible. A preferred mesh sheet 186 is formed from fiberglass fibers extending longitudinally and transversely in a rectangular grid and spaced apart from one another at a center to center distance of approximately two millimeters. A preferred mesh sheet 186 is commonly available dry wall patching material.

The scraper blade 120 includes one or more electrical sensors 196A–C coupled to a surface of the mesh sheet 186 and which are thereby coupled to the plate-like member 152 of the insert member 150. The electrical sensors 196A–C are preferably molded and embedded within the plate-like member 152 between the surfaces 154 and 156. The top ends of the sensors 196A–C are preferably located approximately three-quarters of an inch from the top edge 158 of the plate-like member 152. Although the insert member 150 is shown as including three sensors 196A–C, the insert member 150 may include only one sensor, two sensors or more than three sensors. The sensors 196A and 196B may be electrical strain detection sensors such as strain gage sensors and may be of the uniaxial pattern type of sensor. One type of strain detection sensor that may be used is Part Number CEA-06-250UW-120 of Measurements Group, Inc. of Raleigh, N.C. The electrical sensor 196C may be an electrical temperature sensor. One type of temperature sensor that may be used is Part Number ETG-50B of Measurements Group, Inc. of Raleigh, N.C. One or more of the sensors may be a wear rate sensor. Each electrical sensor 196A–C is electrically connected to an end of a respective lead wire 198A–C. Each lead wire 198A–C is embedded within the plate-like member 152 from the end which is connected to an electrical sensor 196A–C to a respective exit location 200A–C where the lead wires 198A–C extend outwardly from the plate-like member 152 to terminal ends 202 of the lead wires. The terminal end 202 of each lead wire 198A–C may be electrically connected to an electrical connector member and thereby to a microprocessor, computer or the like. Each lead wire 198A–C includes at least two electrical wires.

As best shown in FIGS. 3 and 4, the insert member 150 is molded and embedded within the body 122 of the scraper blade 120. The plate-like member 152 is embedded within the scraping member 126 and within the base member 124 between the inner surface 132 and outer surface 134 of the body 122. The plate-like member 152 is generally centrally located in the body 122 between and spaced apart from the side walls 136 and 138 as shown in FIG. 3. The mounting member 170 of the insert member 150 extends across the width of the body 122 from the side wall 136 to the side wall 138. The lower flange 178 and the web 180 of the mounting member 170 extend into the bore 140 of the body 122. The lead wires 198A–C extend from the exit locations 200A–C of the plate-like member 150 through the body 122 to an exit location 208. The lead wires 198A–C extend outwardly from the body 122 from the exit location 208 to the respective terminal ends 202 of the lead wires.

The strain detection sensors 196A–B measure the strain of the scraper blade 120 due to the flexure of the scraper blade 120, which corresponds to the magnitude of the scraping force with which the scraper blade 120 is biased against the conveyor belt. The strain detection sensors 196A–B each provide a measurement that corresponds to the magnitude of the scraping force with which the scraper blade 120 engages the conveyor belt. Each strain detection sensor 198A–B transmits an electrical signal corresponding to the measured strain and the corresponding scraping force to a microprocessor, computer, or other data storage or analysis device. The temperature sensor 198C measures the temperature of the scraper blade 120 and transmits an electrical signal corresponding to the measured temperature to a microprocessor, computer or other data storage or analysis device. The electrical sensors 196A–C operate in the same manner as the electrical sensors 30, 40, 46, 48 and 54. The lead wires 198A–C may comprise computer communication wire as commonly used in connection with hard drives and CD-ROM drives in computers, with all but two strands of the lead wire removed.

The scraper blade 120 is made by cutting the mesh sheet 186 to a width of approximately two inches and a length of approximately four inches. The mesh sheet 186 is then placed over a positioning guide (not shown) including indicia which provide the location of each of the electrical sensors 196A–C and of the mounting holes 188A–B. The positioning guide may comprise a sheet of paper with locating indicia marked thereon. The electrical sensors 196A–C are then placed on the surface of the mesh sheet 186 in their respective locations as indicated by the locating indicia on the positioning guide. The electrical sensors 196A–C are then coupled to the mesh sheet 186 by adhesive tape or other types of adhesive. The lead wires 198A–C are electrically connected to respective electrical sensors 196A–C by soldering or the like. The mounting holes 188A–B are then made in the mesh sheet 186 with a hole punch in locations as indicated by the locating indicia on the positioning guide. Each end of the mesh sheet 186 is then trimmed such that the mesh sheet 186 has an overall length of approximately three inches.

Figure 7:
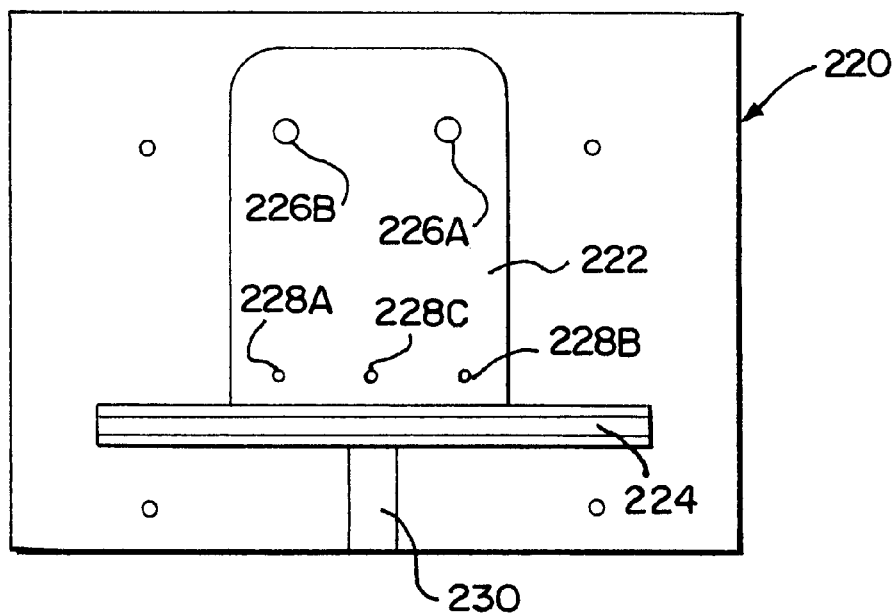
FIG. 7 is a top plan view of an insert mold for the insert member of FIG. 5.

The mesh sheet 186 and the electrical sensors 196A–C are then placed in an insert mold 220 as shown in FIG. 7. The insert mold 220 includes a recess 222 adapted to form the plate-like member 152 of the insert member 150 and a recess 224 adapted to form the mounting member 170 of the insert member 150. The insert mold 220 includes generally cylindrical posts 226A–B located in the recess 222 which extend outwardly from the mold surface. The posts 226A–B are adapted to be inserted through the mounting holes 188A–B of the mesh sheet 186 to properly position the mesh sheet 186 and the electrical sensors 196A–C within the recess 222. The mesh sheet 186 is a positioning member for positioning the sensors 196A–C within the insert member 150 and ultimately within the body 120 in a desired location. The insert mold 220 also includes apertures 228A–C which are located at positions corresponding to the exit locations 200A–C of the insert member 150. The terminal ends 202 of the lead wires 198A–C are inserted through the apertures 228A–C such that the terminal ends 202 are located outside of the insert mold 220. The mold 220 is closed and molten elastomeric material such as urethane or rubber is poured or injected into the recesses 220 and 224 through a passageway 230 in the mold 220. The molten elastomeric material flows through the apertures in the mesh sheet 186 and adheres to the electrical sensors 196A–C. The elastomeric material is then allowed to cool and solidify. The mesh sheet 186 and electrical sensors 196A–C are thereby molded and embedded within the plate-like member 152 of the insert member 150. The insert member 150 is then removed from the insert mold 220.

Figure 8:
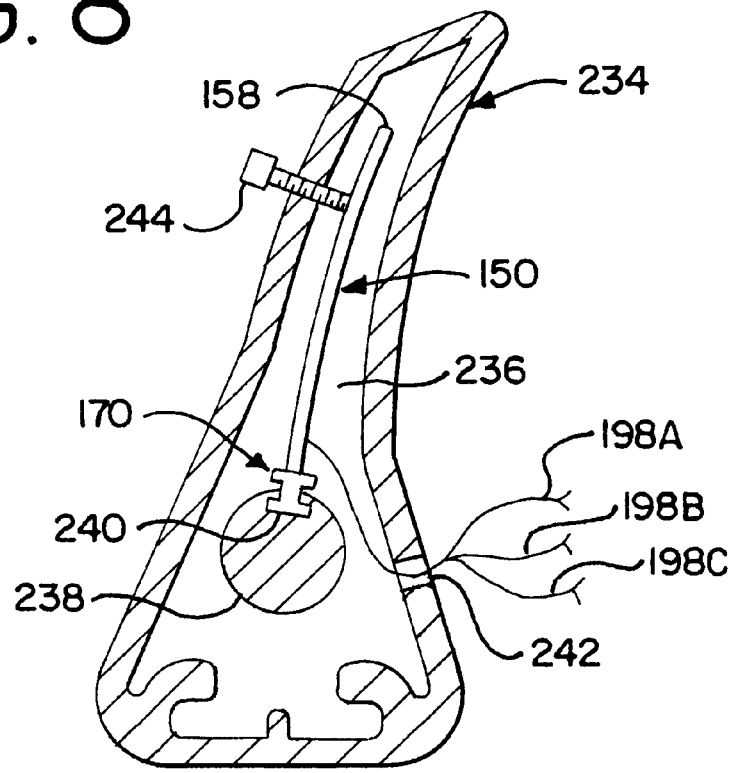
FIG. 8 is a cross sectional view of a body mold for the scraper blade body of FIG. 3 shown with the insert member positioned therein.

The insert member 150 is next inserted into a scraper blade body mold 234 as shown in FIG. 8. The body mold 234 includes a recess 236. The body mold 234 also includes a generally cylindrical shaft 238 located within the recess 236 which is adapted to form the bore 140 in the body 122 of the scraper blade 120. The shaft 238 includes an elongate generally T-shaped slot 240. The T-shaped slot 240 is adapted to slidably receive the lower flange 178 and web 180 of the mounting member 170 of the insert member 150. The mounting member 170 thereby slidably and removably mounts the base or bottom end of the insert member 150 to the shaft 238 in a desired position within the recess 236. The front wall of the body mold 32 includes an aperture or slot 242 through which the terminal ends 202 of the lead wires 198A–C are inserted such that the terminal ends 202 are located outside of the recess 236.

The body mold 234 includes an adjustment member 244 such as a threaded bolt. The adjustment member 244 is threadably attached to the body mold 234 such that the tip of the adjustment member 244 is located within the recess 236 and the head of the adjustment member 244 is located outside of the body mold 234. The adjustment member 244 is selectively rotated to insert or retract the tip of the adjustment member 244 within the recess 236. The tip of the adjustment member 244 engages the plate-like member 152 of the insert member 150 and pivots or bends the plate-like member 150 with respect to the mounting member 170 to thereby locate the plate-like member 152 in a desired location within the recess 236 of the body mold 234. The insert member 150 is a positioning member for positioning the sensors 196A–C within the body 122 of the scraper blade 120 in a desired location. The body mold 234 is closed and molten elastomeric material such as urethane or rubber is then poured or injected into the recess 236 of the body mold 234 to mold the body 122. The molten elastomeric material melts the outer surfaces of the elastomeric material of the plate-like member 152 and of the mounting member 170 of the insert member 150 that come into contact with the molten elastomeric material. The elastomeric material is allowed to cool and solidify. The insert member 150 thereby becomes integrally attached to the body 122. The elastomeric material that forms the body 122 is preferably the same type of urethane or the same type of rubber that is used to form the insert member 150 so that the scraper blade 120 will have uniform mechanical properties. The adjustment member 244 is then retracted from the recess 236. The cast scraper blade 120 is then removed from the body mold 234.

When the scraping tip 130 of the scraper blade 120 is in scraping engagement with a moving conveyor belt, the outer end of the scraping member 126 will wear away such that the location of the scraping tip 130 will move toward the base member 124. When the outer end of the scraping member 126 wears to the position of the sensors 196A–C, the sensors 196A–C will become worn and will eventually stop functioning. The worn scraper blade 120 may be replaced at this time with a new scraper blade. However, if desired, the worn scraper blade 120 can continue to be used for cleaning a conveyor belt as the scraping member 126 can be worn beyond the sensors 196A–C. The sensors 196A–C are designed such that they will not damage the conveyor belt if the sensors engage the moving belt.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A conveyor belt cleaner scraper blade for cleaning the surface of a conveyor belt, said scraper blade including:
    a body having a base member and a scraping tip adapted to engage the conveyor belt;
    one or more electrical sensors embedded within said body; and
    a positioning member coupled to said scraper blade, said positioning member adapted to position said one or more electrical sensors at a desired location within said body.

2. The conveyor belt cleaner scraper blade of claim 1 wherein said positioning member comprises an insert member embedded within said body, said one or more electrical sensors being coupled to said insert member.

3. The conveyor belt cleaner scraper blade of claim 2 wherein said one or more electrical sensors are embedded within said insert member.

4. The conveyor belt cleaner scraper blade of claim 3 including a sheet embedded within said insert member, said one or more electrical sensors being coupled to said sheet.

5. The conveyor belt cleaner scraper blade of claim 4 wherein said sheet comprises a mesh sheet including a plurality of apertures.

6. The conveyor belt cleaner scraper blade of claim 3 wherein said sheet includes one or more mounting holes.

7. The conveyor belt cleaner scraper blade of claim 2 wherein said insert member includes a first end and a second end, said second end of said insert member including a mounting member.

8. The conveyor belt cleaner scraper blade of claim 7 wherein said mounting member of said insert member includes a generally T-shaped member.

9. The conveyor belt cleaner scraper blade of claim 7 wherein said mounting member of said insert member includes a generally I-shaped member.

10. The conveyor belt cleaner scraper blade of claim 2 wherein said insert member includes a generally plate-like member having a first surface and a spaced apart second surface, said one or more electrical sensors being embedded within said plate-like member.

11. The conveyor belt cleaner scraper blade of claim 2 wherein said insert member is formed from an elastomeric material.

12. The conveyor belt cleaner scraper blade of claim 11 wherein said one or more electrical sensors are embedded within said elastomeric material.

13. The conveyor belt cleaner scraper blade of claim 11 wherein said body is formed from an elastomeric material.

14. The conveyor belt cleaner scraper blade of claim 2 wherein said body includes a bore and said insert member extends into said bore.

15. The conveyor belt cleaner scraper blade of claim 2 wherein said body includes a scraping member extending outwardly from said base member, said scraping member including said scraping tip, said insert member being embedded within said scraping member of said body.

16. The conveyor belt scraper blade of claim 1 wherein said positioning member comprises a sheet embedded within said body, said one or more electrical sensors being coupled to said sheet.

17. The conveyor belt scraper blade of claim 16 wherein said sheet comprises a mesh sheet including a plurality of apertures.

18. The conveyor belt scraper blade of claim 16 wherein said sheet includes one or more mounting holes.

19. The conveyor belt cleaner scraper blade of claim 1 wherein said one or more electrical sensors include a temperature sensor.

20. The conveyor belt cleaner scraper blade of claim 1 wherein said one or more electrical sensors include a strain detection sensor.

21. The conveyor belt cleaner scraper blade of claim 1 wherein said one or more electrical sensors include a wear sensor.

22. A method of making a conveyor belt cleaner scraper blade having one or more electrical sensors, said method comprising:
    coupling said one or more electrical sensors to a positioning member;
    positioning said positioning member and said one or more electrical sensors in a mold; and
    molding a scraper blade body in the mold with said positioning member and said one or more electrical sensors embedded within said scraper blade body.

23. The method of claim 22 wherein said one or more electrical sensors are coupled to said positioning member by inserting said one or more electrical sensors into an insert mold and molding said positioning member within said insert mold such that said one or more electrical sensors are embedded within said positioning member.

24. The method of claim 23 including coupling said one or more electrical sensors to a mesh sheet prior to inserting said one or more electrical sensors into said insert mold.

25. The method of claim 22 including attaching a first end of said positioning member to the mold when said positioning member is positioned in the mold.

26. The method of claim 25 including positioning a second end of said positioning member within the mold at a desired location.

27. The method of claim 22 wherein one or more lead wires are respectively connected to said one or more electrical sensors and wherein said lead wires are inserted through the mold prior to molding said scraper blade body such that the terminal ends of the lead wires are located outside of the mold.

28. The method of claim 22 wherein said scraper blade body is molded from an elastomeric material.

29. The method of claim 23 wherein said positioning member is molded from an elastomeric material.

30. The method of claim 22 including adjusting the position of said one or more electrical sensors within said mold after said one or more electrical sensors are positioned within said mold.

* * * * *